(12) United States Patent
Chang et al.

(10) Patent No.: US 8,363,341 B2
(45) Date of Patent: Jan. 29, 2013

(54) FIXED-FOCUS LENS MODULE

(75) Inventors: Chia-Chun Chang, Taipei Hsien (TW); Hou-Yao Lin, Taipei Hsien (TW); Sheng-Jung Yu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 440 days.

(21) Appl. No.: 12/761,401

(22) Filed: Apr. 16, 2010

(65) Prior Publication Data

US 2011/0058265 A1    Mar. 10, 2011

(30) Foreign Application Priority Data

Sep. 10, 2009   (CN) .......................... 2009 1 0306860

(51) Int. Cl.
G02B 5/04 (2006.01)
G02B 25/00 (2006.01)
G02B 21/02 (2006.01)

(52) U.S. Cl. ........ 359/819; 359/811; 359/816; 359/821; 359/822; 359/823; 359/826; 359/643; 359/646; 359/661

(58) Field of Classification Search .................. 359/819, 359/826, 829
See application file for complete search history.

(56) References Cited

U.S. PATENT DOCUMENTS

| | | | | |
|---|---|---|---|---|
| 4,258,982 A * | 3/1981 | Skinner et al. | ................ | 359/819 |
| 4,778,253 A * | 10/1988 | Siga et al. | ................... | 359/819 |
| 2003/0011902 A1* | 1/2003 | Nishimura et al. | ........... | 359/819 |
| 2008/0151396 A1* | 6/2008 | Chiang | ........................ | 359/823 |
| 2008/0266680 A1* | 10/2008 | Chiang | ........................ | 359/819 |

* cited by examiner

*Primary Examiner* — Scott J Sugarman
*Assistant Examiner* — Robert E Tallman
(74) *Attorney, Agent, or Firm* — Altis Law Group, Inc.

(57) ABSTRACT

A fixed-focus lens module includes an outer lens barrel, an inner lens, a first lens, and a second lens group. The outer lens barrel includes a first open end, a first cavity, and a second open end arranged in the order from the object side to the image side of the outer lens barrel. The inner lens barrel is received in the outer lens barrel adjacent to the first open end. The first lens is received in the inner lens barrel. The second lens group is received in the outer lens barrel adjacent to the second open end. An gap is defined between an outer wall of the inner lens barrel and an inner wall of the outer lens barrel at the first open end, and the center axis of the inner lens barrel is adjustable relative to the outer lens barrel for adjusting the alignment between the first lens and the second lens group.

8 Claims, 2 Drawing Sheets

FIXED-FOCUS LENS MODULE

BACKGROUND

1. Technical Field

The present disclosure relates to lens modules, and particularly, to a fixed-focus lens module.

2. Description of Related Art

In production of lens modules, the offset of the alignment of a number of lenses received in the lens barrel must be kept in a reasonable range, in order to ensure that a camera with the lens module can capture quality images. More particularly, the most important factor for getting a quality image is to ensure the alignment of a first lens nearest to the object side and other lenses received in an integrated lens barrel. However, in assembly of lens modules, the first lens is firstly fixed in the lens barrel according to the inner side of the integrated lens barrel, then the other lenses are fixed in the lens barrel according to the central axis of the first lens. Therefore, if the central axis of the first lens is not concentric with the central axis of the lens barrel, the other lenses will not align properly, thereby the quality of the images captured by the lens module will be affected.

What is needed, therefore, is a fixed-focus lens module to overcome the described problems.

BRIEF DESCRIPTION OF THE DRAWINGS

Many aspects of the present fixed-focus lens module can be better understood with reference to the following drawings. The components in the drawings are not necessarily drawn to scale, the emphasis instead being placed upon clearly illustrating the principles of the fixed-focus lens module.

DETAILED DESCRIPTION

Embodiments of the present disclosure will now be described in detail below, with reference to the accompanying drawings.

Figure 1:
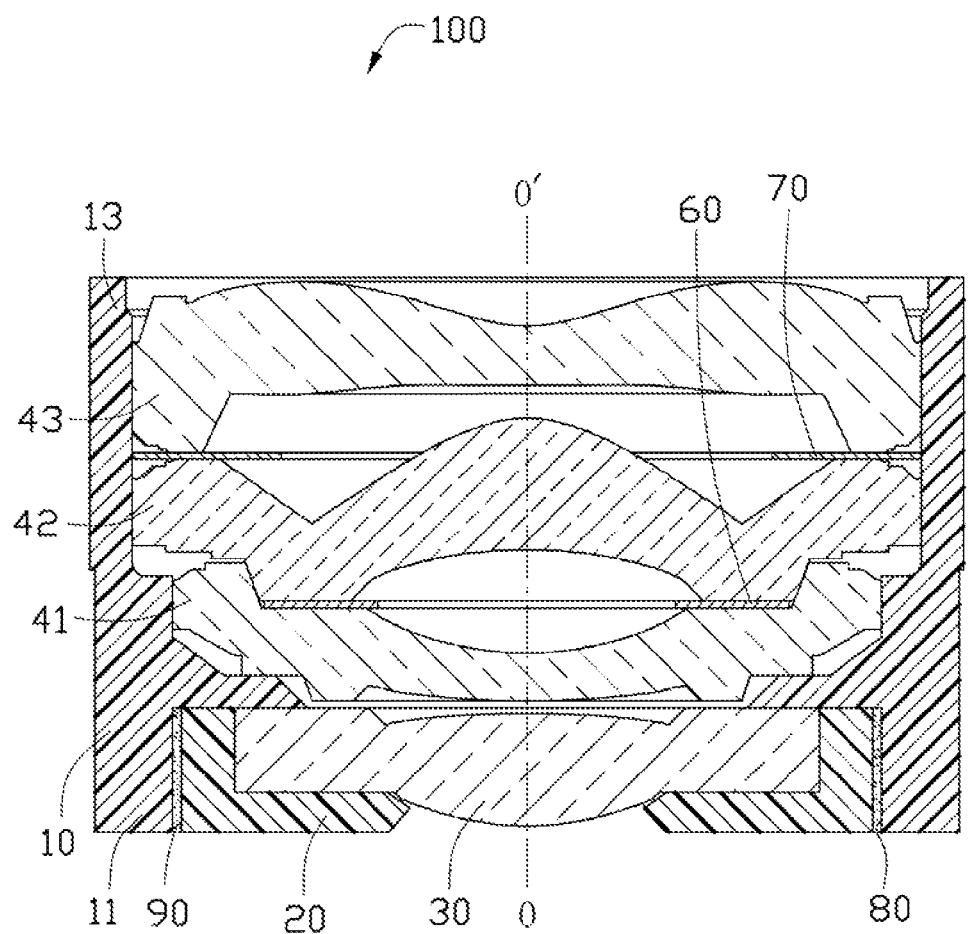
FIG. 1 is a sectional view of a fixed-focus lens module according to an exemplary embodiment.
Figure 2:
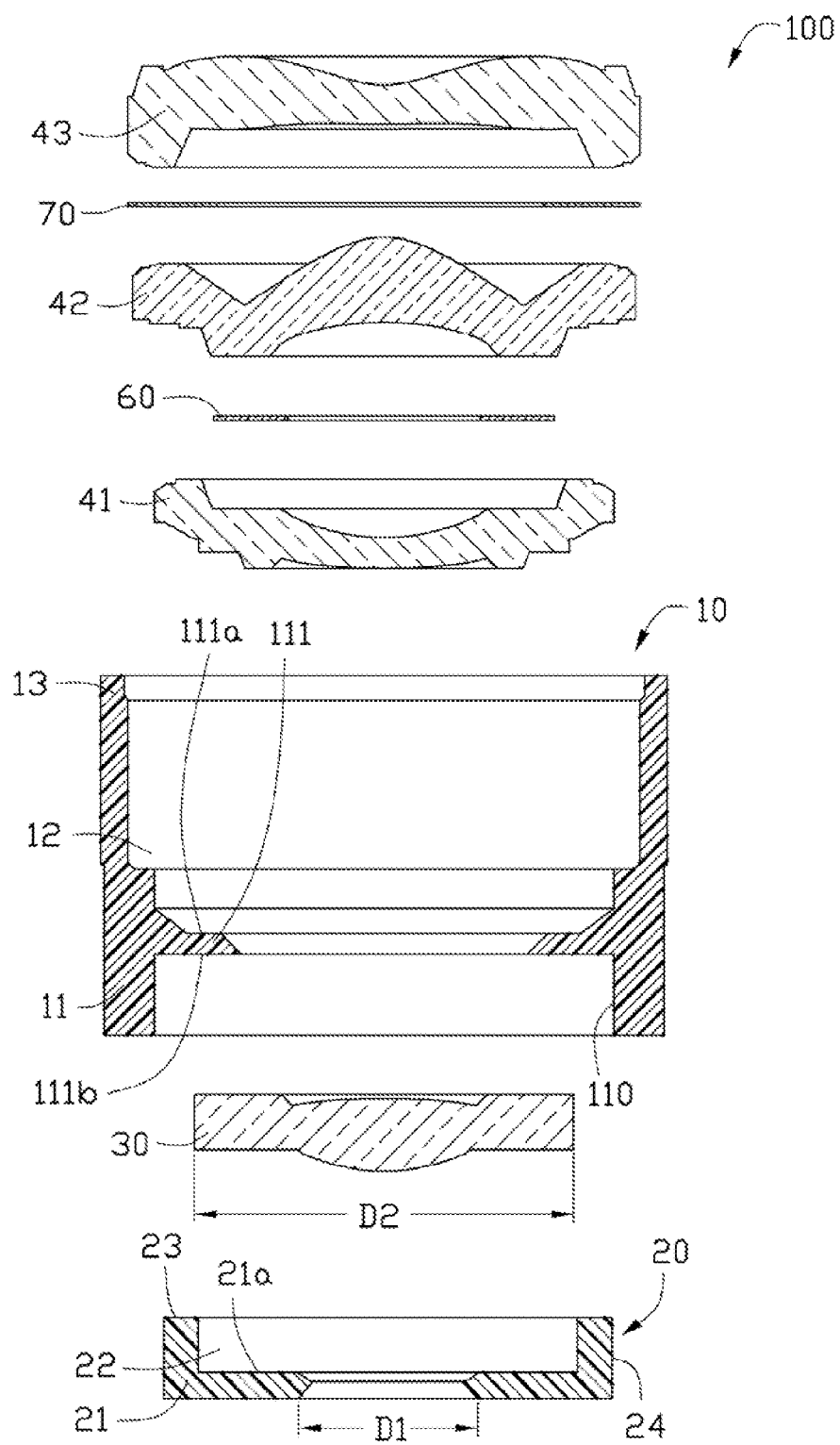
FIG. 2 is an exploded, sectional view of the fixed-focus lens module of FIG. 1.

Referring to FIGS. 1 and 2, a fixed-focus lens module 100, according to an exemplary embodiment, is shown. The fixed-focus lens module 100 includes an outer lens barrel 10, an inner lens barrel 20, a first lens 30, a second lens group 40, a first spacer 60 and a second spacer 70. In the present embodiment, the second lens group 40 includes three lenses 41, 42, 43.

The outer lens barrel 10 is tubular and includes a first open end 11, a first cavity 12, and a second open end 13 arranged in the order from the object side to the image side. The outer lens barrel 10 can be comprised of plastic or metal. In the present embodiment, the outer lens barrel 10 is comprised of plastic. The first open end 11 includes a first inner wall 110. The first cavity 12 communicates the first open end 11 to the second open end 13. An annular protrusion 111 extends inwardly from the first inner wall 110. The annular protrusion 111 is contiguous with the first open end 11. The lens 41 resists against one side 111a of the annular protrusion 111 facing the second open end 13. The lens 41, the first spacer 60, the lens 42, the second spacer 70, and the lens 43 are received in the first cavity 12, in that order from the object side to the image side of the outer lens barrel 10.

The inner lens barrel 20 is tubular and includes a third open end 21, a second cavity 22, and a fourth open end 23 arranged in that order from the object side to the image side of the inner lens barrel 20. The inner lens barrel 20 can be comprised of plastic or metal. In the present embodiment, inner lens barrel 20 is comprised of plastic. The second cavity 22 is connected the third open end 21 to the fourth open end 23. The first lens 30 is received in the second cavity 22. The inside diameter D1 of the third open end 21 is smaller than the outside diameter D2 of the first lens 30. The third open end 21 is configured for limiting the amount of light into the first lens 30. In the present embodiment, the first lens 30 resists against one side 21a of the third open end 21 facing the fourth open end 23, and the first lens 30 is adhered to the second cavity 22. The fourth open end 23 is received in the first open end 11 of the outer barrel 10, and resists against one side 111b of the annular protrusion 111 facing the first open end 11. The inner lens barrel 20 includes a second outer wall 24. An gap 80 is defined between the second outer wall 24 of the inner lens barrel 20 and the first inner wall 110 of the first open end 11. Because the gap 80 exists between the second outer wall 24 and the first inner wall 110, the center axis of the inner lens barrel 20 is adjustable relative to the outer lens barrel 10 for adjusting the alignment between the first lens 30 and the second lens group 40 to decrease the offset of the alignment between the first lens 30 and the second lens group 40. After adjusting, an adhesive 90 is applied in the gap 80 between the second outer wall 24 and the first inner wall 110 to adhered the inner lens barrel 20 to the outer lens barrel 10.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A fixed-focus lens module comprising:
    an outer lens barrel comprising a first open end, a first cavity, and a second open end arranged in the order from the object side to the image side thereof;
    an inner lens barrel received in the outer lens barrel adjacent to the first open end;
    a first lens received in the inner lens barrel;
    a second lens group received in the outer lens barrel adjacent to the second open end;
    wherein a gap is defined between an outer wall of the inner lens barrel and an inner wall of the outer lens barrel at the first open end, and the center axis of the inner lens barrel is adjustable relative to the outer lens barrel for adjusting the alignment between the first lens and the second lens group;
    wherein an annular protrusion extends inwardly from the inner wall of the outer lens barrel and contiguous with the first open end, and the inner lens barrel rests against the annular protrusion.

2. The fixed-focus lens module as claimed in claim 1, wherein an adhesive is applied in the gap between the outer wall of the inner lens barrel and the inner wall of the outer lens barrel at the first open end to fix the inner lens barrel to the outer lens barrel.

3. The fixed-focus lens module as claimed in claim 1, wherein the second lens group comprises two lenses and a spacer arranged between the lenses.

4. The fixed-focus lens module as claimed in claim 1, wherein the inner lens barrel includes a third open end and a fourth open end opposite to the third open end, the inside diameter of the third open end is smaller than the outside diameter of the first lens, the first lens rests against one side of the third open end facing the fourth open end, the fourth open end is received in the first open end, and rests against one side of the annular protrusion facing the first open end.

5. The fixed-focus lens module as claimed in claim 1, wherein the first lens is adhered to the inner lens barrel.

6. The fixed-focus lens module as claimed in claim 1, wherein the second lens group is adhered to the outer lens barrel.

7. The fixed-focus lens module as claimed in claim 1, wherein the inner lens barrel and the outer lens barrel each have a tubular configuration.

8. The fixed-focus lens module as claimed in claim 1, wherein both the outer lens barrel and the inner lens barrel are comprised of plastic material.

* * * * *